W. B. Gleason,
Composition Handle.

No. 101,119. Patented Mar. 22, 1870.

Witnesses: W. F. Crosby, C. Warren Brown

W. B. Gleason

United States Patent Office.

WILLIAM B. GLEASON, OF BOSTON, MASSACHUSETTS.

Letters Patent No. 101,119, dated March 22, 1870.

IMPROVED COMPOSITION HANDLE OR PULL.

The Schedule referred to in these Letters Patent and making part of the same.

*To all whom it may concern:*

Be it known that I, WILLIAM B. GLEASON, of Boston, in the county of Suffolk and State of Massachusetts, have invented an improved Composition Handle or Pull; and I do hereby declare that the following, taken in connection with the drawings which accompany and form part of this specification, is a description of my invention sufficient to enable those skilled in the art to practice it.

This invention is an improvement upon the patent No. 71,294, granted to me November 26, 1867, in which I describe generally, ornaments made of a plastic compound of gelatine and comminuted woody fiber, mixed in a moist heated condition, and formed into shape in molds under pressure.

My present invention consists in a definite article of manufacture, the same being a handle or pull made of a plastic compound, in which the ingredients are intermixed in a moist condition, and generally and preferably in a heated state, and finished as to form, (which is preferably and usually ornamental) and surface, by pressure in a mold, when it has made in the back, by and in the act of molding in a mold under pressure, a depression in which, when the handle is secured upon a draw-front or other object, the fingers of a person's hand may be entered to obtain a hold through which a pull may be exerted, the handle being otherwise completed and made ready for sale by being simply deprived of its moisture, and, when necessary, wrought on the back to fit the surface to which it is to be attached.

In manufacturing my said article I force into the plastic material with which the mold is filled, a block which is the reverse counterpart of the depression which I desire to leave in the handle, one surface of the block adjoining the surface of the mold. When the mold and its contents have received the requisite pressure I remove the block from the handle, previously to removing the latter from the mold, and then finish the handle by drying out the moisture.

In the drawings—

Figure 2:
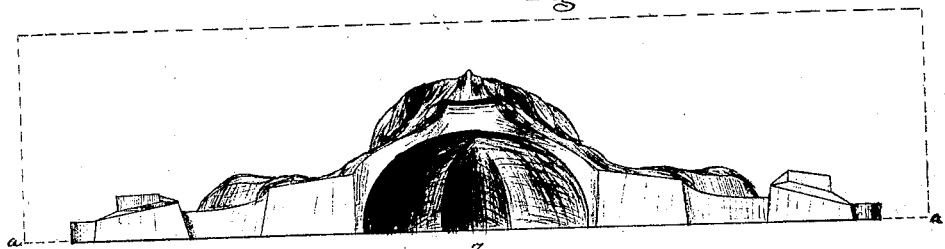
Figure 2 shows the same in edge view.
Figure 3:
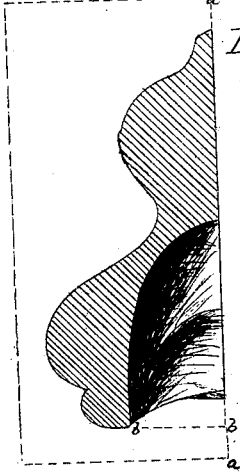
Figure 3 is a cross-section, taken in the plane of the line *z z.*

In figs. 2 and 3 the straight dotted lines represent the outline of the material in which the mold is sunken, into which the composition is to be compressed to form the handle.

The back of the handle is in the plane *a a*, and from that plane the depression which makes the cavity for reception of the fingers is sunken into the body of the plastic composition.

Figure 1:
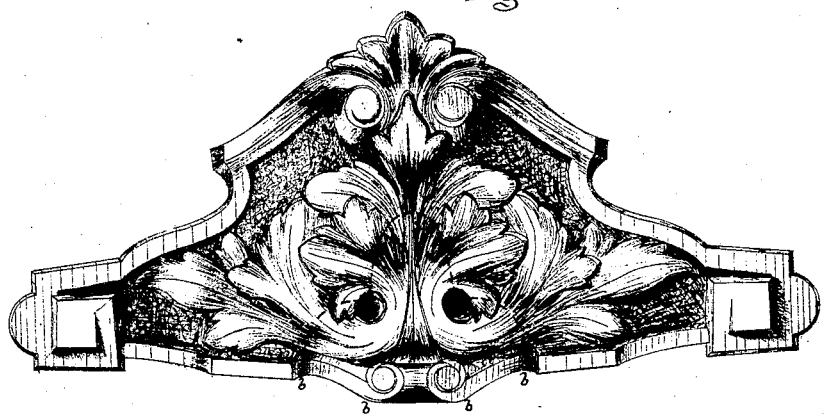
Figure 1 represents a front view of my improved handle.

The block which is used to form the finger-cavity has one surface at *b b*, in contact with the opposed inner surface of the mold, the block showing its form of cross-section in fig. 3, its front elevation in fig. 2, and its plan by the heavy dotted line in fig. 1, the cavity in the handle corresponding with the form of the block.

I claim, as a new article of manufacture, a plastic composition handle, formed as described.

W. B. GLEASON.

Witnesses:
J. B. CROSBY,
C. WARREN BROWN.